(12) United States Patent
Moton, Jr. et al.

(10) Patent No.: US 11,798,276 B2
(45) Date of Patent: Oct. 24, 2023

(54) PROVIDING INFORMATION ABOUT MEMBERS OF A GROUP USING AN AUGMENTED REALITY DISPLAY

(71) Applicant: AT&T Intellectual Property I, L.P., Atlanta, GA (US)

(72) Inventors: Robert Moton, Jr., Alpharetta, GA (US); Adrianne Luu, Atlanta, GA (US); James Pratt, Round Rock, TX (US); Barrett Kreiner, Woodstock, GA (US); Walter Cooper Chastain, Atlanta, GA (US); Robert Koch, Peachtree Corners, GA (US); Ari Craine, Marietta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 17/338,653

(22) Filed: Jun. 3, 2021

(65) Prior Publication Data
US 2022/0391618 A1    Dec. 8, 2022

(51) Int. Cl.
  *G06V 20/20* (2022.01)
  *G06F 16/9035* (2019.01)
  *G06T 19/00* (2011.01)
(52) U.S. Cl.
  CPC .......... *G06V 20/20* (2022.01); *G06F 16/9035* (2019.01); *G06T 19/006* (2013.01)

(58) Field of Classification Search
  CPC .... G06V 20/20; G06F 16/9035; G06T 19/006
  See application file for complete search history.

(56) References Cited

U.S. PATENT DOCUMENTS

| | | | |
|---|---|---|---|
| 9,613,448 B1* | 4/2017 | Margolin | G06T 11/001 |
| 2013/0044130 A1* | 2/2013 | Geisner | G06T 19/006 |
| | | | 345/633 |
| 2014/0192085 A1* | 7/2014 | Kim | G07B 11/00 |
| | | | 345/633 |
| 2018/0189568 A1* | 7/2018 | Powderly | G06T 19/006 |
| 2018/0284453 A1* | 10/2018 | Irvin | G06T 19/006 |
| 2018/0341811 A1* | 11/2018 | Bendale | G06V 10/25 |
| 2022/0148307 A1* | 5/2022 | Dascola | G06V 40/171 |
| 2022/0230396 A1* | 7/2022 | Croxford | G02B 27/0103 |

FOREIGN PATENT DOCUMENTS

| | | | | |
|---|---|---|---|---|
| AU | 2013327599 A1 * | 5/2015 | .......... | A63F 13/213 |
| CN | 112750206 A * | 5/2021 | ............ | G01S 19/51 |

* cited by examiner

*Primary Examiner* — Chante E Harrison

(57) ABSTRACT

In one example, a method performed by a processing system including at least one processor includes identifying an environment surrounding a user of an augmented reality display, identifying a relative location of the user within the environment, determining a field of view of the augmented reality display, identifying an individual within the field of view, querying a data source for information related to the individual, and modifying the augmented reality display to present the information related to the individual.

18 Claims, 5 Drawing Sheets

US 11,798,276 B2

PROVIDING INFORMATION ABOUT MEMBERS OF A GROUP USING AN AUGMENTED REALITY DISPLAY

The present disclosure relates generally to augmented reality (AR) systems, and relates more particularly to devices, non-transitory computer-readable media, and methods for providing information about members of a group using an augmented reality display.

BACKGROUND

Augmented reality (AR) comprises a subset of extended reality (XR) technology in which objects that reside in the real world are augmented with computer-generated information. AR may thus be used to enhance real world environments or situations and offer perceptually enriched or immersive experiences.

SUMMARY

In one example, the present disclosure describes a device, computer-readable medium, and method for providing information about members of a group using an interactive augmented reality display. For instance, in one example, a method performed by a processing system including at least one processor includes identifying an environment surrounding a user of an augmented reality display, identifying a relative location of the user within the environment, determining a field of view of the augmented reality display, identifying an individual within the field of view, querying a data source for information related to the individual, and modifying the augmented reality display to present the information related to the individual.

In another example, a non-transitory computer-readable medium stores instructions which, when executed by a processing system, including at least one processor, cause the processing system to perform operations. The operations include identifying an environment surrounding a user of an augmented reality display, identifying a relative location of the user within the environment, determining a field of view of the augmented reality display, identifying an individual within the field of view, querying a data source for information related to the individual, and modifying the augmented reality display to present the information related to the individual.

In another example, a device includes a processing system including at least one processor and a computer-readable medium storing instructions which, when executed by the processing system, cause the processing system to perform operations. The operations include identifying an environment surrounding a user of an augmented reality display, identifying a relative location of the user within the environment, determining a field of view of the augmented reality display, identifying an individual within the field of view, querying a data source for information related to the individual, and modifying the augmented reality display to present the information related to the individual.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one example, the present disclosure provides interactive augmented reality (AR) displays which may be used to present information about members of a group. As discussed above, AR comprises a subset of extended reality (XR) technology in which objects that reside in the real world are augmented with computer-generated information. As such, AR technologies may be well suited to industries in which information about members of a group needs to be conveyed to an individual who is assisting the group, such as the travel and hospitality industries, education, entertainment, and the like (e.g., on airplanes, in classrooms and conference centers, in theme parks, in concert and sports venues, and the like).

Examples of the present disclosure provide a system which presents information about members of a group via an AR display, such as a pair of AR glasses. In particular, a database may store information about a plurality of individuals, and an AR server (e.g., an application server) may access the database to retrieve information that specifically relates to individuals who belong to a group who a user is trying to assist. The information may be formatted by the AR server for presentation on an AR display belonging to the user, such as a pair of AR glasses that the user is wearing. The information may help the user to provide services to and to manage the group. The interactive AR display may be used, for example, by flight attendants providing services to a group of air travelers, by teachers overseeing students in a classroom, by a speaker presenting to attendees of a conference, by a host providing services to patrons at a theme park, a concert, or a sporting event, and the like. These and other aspects of the present disclosure are described in greater detail below in connection with the examples of FIGS. 1-6.

Figure 1:
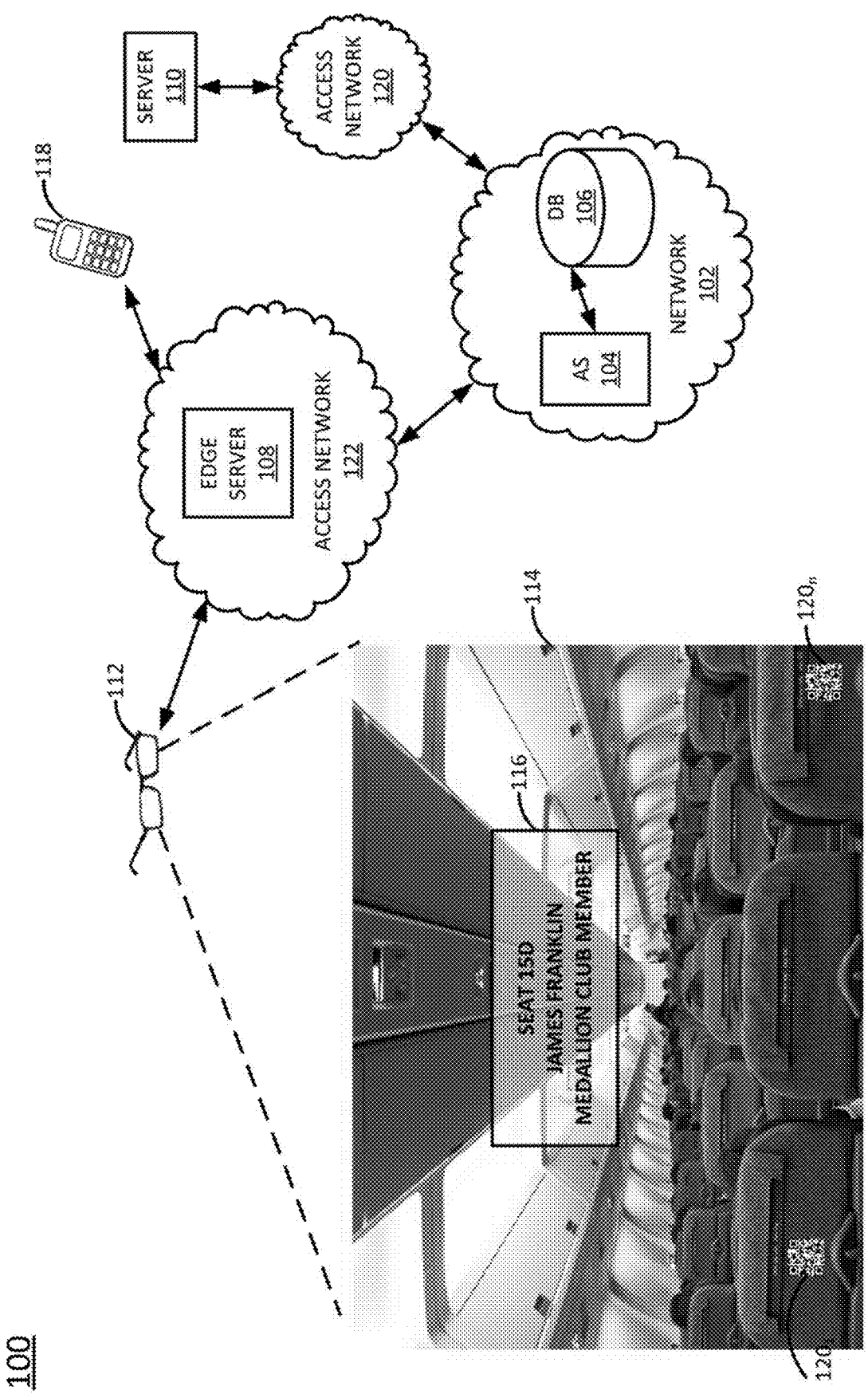
FIG. 1 illustrates an example system in which examples of the present disclosure may operate.

To further aid in understanding the present disclosure, FIG. 1 illustrates an example system 100 in which examples of the present disclosure may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wireless network, a cellular network (e.g., 2G, 3G, and the like), a long term evolution (LTE) network, 5G and the like related to the current disclosure. It should be noted that an IP network is broadly defined as a network that uses Internet Protocol to exchange data packets. Additional example IP networks include Voice over IP (VoIP) networks, Service over IP (SoIP) networks, and the like.

In one example, the system 100 may comprise a network 102, e.g., a telecommunication service provider network, a core network, or an enterprise network comprising infrastructure for computing and communications services of a business, an educational institution, a governmental service, or other enterprises. The network 102 may be in communication with one or more access networks 120 and 122, and the Internet (not shown). In one example, network 102 may combine core network components of a cellular network with components of a triple play service network; where triple-play services include telephone services, Internet or data services and television services to subscribers. For example, network 102 may functionally comprise a fixed mobile convergence (FMC) network, e.g., an IP Multimedia Subsystem (IMS) network. In addition, network 102 may functionally comprise a telephony network, e.g., an Internet Protocol/Multi-Protocol Label Switching (IP/MPLS) backbone network utilizing Session Initiation Protocol (SIP) for circuit-switched and Voice over internet Protocol (VoIP) telephony services. Network 102 may further comprise a broadcast television network, e.g., a traditional cable provider network or an internet Protocol Television (IPTV) network, as well as an Internet Service Provider (ISP) network. In one example, network 102 may include a plurality of television (TV) servers (e.g., a broadcast server, a cable head-end), a plurality of content servers, an advertising server (AS), an interactive TV/video on demand (VoD) server, and so forth.

In one example, the access networks 120 and 122 may comprise broadband optical and/or cable access networks, Local Area Networks (LANs), wireless access networks (e.g., an IEEE 802.11/Wi-Fi network and the like), cellular access networks, Digital Subscriber Line (DSL) networks, public switched telephone network (PSTN) access networks, $3^{rd}$ party networks, and the like. For example, the operator of network 102 may provide a cable television service, an IPTV service, or any other types of telecommunication service to subscribers via access networks 120 and 122. In one example, the access networks 120 and 122 may comprise different types of access networks, may comprise the same type of access network, or some access networks may be the same type of access network and other may be different types of access networks. In one example, the network 102 may be operated by a telecommunication network service provider. The network 102 and the access networks 120 and 122 may be operated by different service providers, the same service provider or a combination thereof, or may be operated by entities having core businesses that are not related to telecommunications services, e.g., corporate, governmental or educational institution LANs, and the like.

Figure 6:
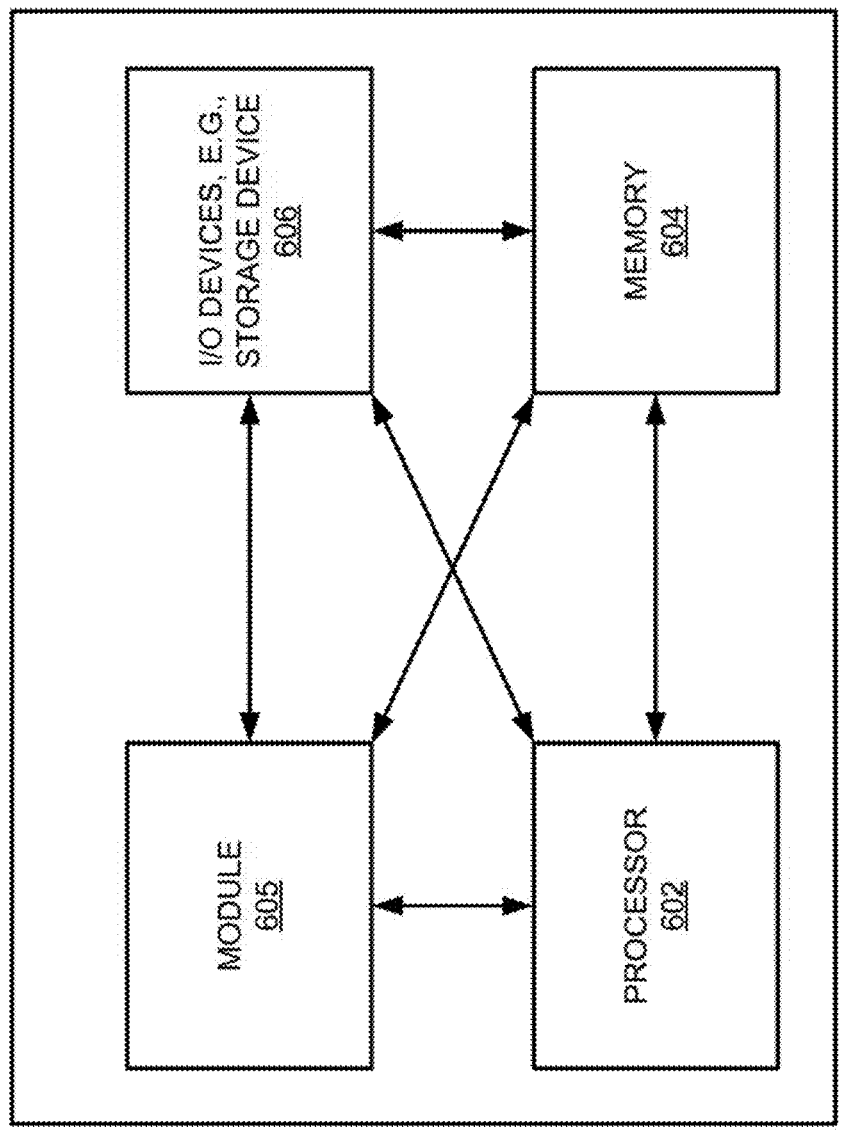
FIG. 6 depicts a high-level block diagram of a computing device specifically programmed to perform the functions described herein.

In accordance with the present disclosure, network 102 may include an application server (AS) 104, which may comprise a computing system or server, such as computing system 600 depicted in FIG. 6, and may be configured to provide one or more operations or functions in connection with examples of the present disclosure for providing interactive augmented reality (AR) displays which may be used to present information about members of a group. The network 102 may also include a database (DB) 106 that is communicatively coupled to the AS 104.

It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 6 and discussed below) or multiple computing devices collectively configured to perform various steps, functions, and/or operations in accordance with the present disclosure. Thus, although only a single application server (AS) 104 and single database (DB) are illustrated, it should be noted that any number of servers may be deployed, and which may operate in a distributed and/or coordinated manner as a processing system to perform operations in connection with the present disclosure.

In one example, AS 104 may comprise a centralized network-based server for providing interactive augmented reality (AR) displays which may be used to present information about members of a group. For instance, the AS 104 may host an application that communicates with a remote augmented reality display (e.g., display 112, discussed in greater detail below) in order to present information to a user in an interactive and/or immersive manner. For instance, in one example, the augmented reality display 112 may be a pair of AR glasses worn by a user who is providing services to and/or managing a group of individuals (e.g., travelers, visitors, students, conference attendees, etc.). The augmented reality display 112 may send information about a user's current environment 114 (e.g., identifiers of AR markers detected by the augmented reality display 112 or the like). Based on the information about the user's current environment 114 (which, in the example of FIG. 1, is the cabin of an airplane), the AS 104 may identify one or more individuals within the user's current environment 114 and/or field of view (e.g., by detecting signals from devices operated by the individuals, from the individuals "checking in" with an AR service or another service, or the like). The AS 104 may then retrieve and provide information about the individuals to the augmented reality display 112 for display to the user. For instance, in one example, the AS 104 may generate a digital overlay 116 containing the information, where the augmented reality display 112 may present the digital overlay 116 on the surface a pair of AR glasses (e.g., such that the information is superimposed over the view of the real world through the AR glasses). In another example, the AS 104 may simply provide information to the augmented reality display 112, and the augmented reality display 112 may generate the digital overlay 116 locally using the provided information.

In one example, AS 104 may comprise a physical storage device (e.g., a database server), to store information about various individuals. In one example, all of the individuals for whom the AS 104 stores information may have something in common. For instance, all of the individuals may have frequent flier accounts with the same airline, all of the individuals may be students at the same school, all of the individuals may hold season passes to the same theme park or sports team, or the like.

In another example, the DB 106 (or multiple instances of the DB 106) may store the information about the individuals, and the AS 104 may retrieve the information from the appropriate DB 106 when needed. For example, each different organization that serves groups of individuals may maintain a separate database that stores information about the individuals who the organization serves. For instance, one database may store information about the customers of an airline; another database may store information about the students who attend a school; another database may store information about the visitors to a theme park; and the like.

In one example, each DB 106 may maintain a profile for each individual for whom information is maintained. The profile may include one or more of the following items of information: the individual's name, an identification number (e.g., frequent flier number, season pass account number, student identifier, or the like) associated with the individual, a seat number assigned to the individual (e.g., on an airplane or train, in a stadium or theater, etc.), contact information (e.g., email address, mobile phone number, etc.) for the individual, an identifier for the individual's belongings (e.g., checked luggage or other items), a priority status assigned to the individual (e.g., VIP, elite status, etc.), health data associated with the individual (e.g., existing allergies, medical conditions, special needs, etc., as well as real-time health data which may be provided via sensors in and/or around the individual's seat), a privacy status associated with the individual (e.g., what types of information the individual is willing or not willing to share with the AR system), a rating associated with the individual (e.g., ease of historical interactions with the individual), the individual's preferences (e.g., aisle seating, vegetarian meals, quiet car, lighting and temperature preferences, etc.), identifiers (e.g., names, identification numbers, or the like) of the individual's frequent companions or contacts (e.g., family members, potentially including seat numbers and other information for these companions), and/or the individual's status on the present day (e.g., flight numbers, flight times, gate changes, delays, rental car or shuttle reservations, hotel reservations, etc.). The profile may be stored in encrypted form to protect the individual's privacy.

In a further example, the individual profiles may not be stored in a centralized location such as a server or database. Instead, the profiles may be stored on the devices of the individuals (e.g., an individual's mobile phone, smart watch, or the like, such as device 118 in FIG. 1), and the AS 104 may retrieve the profiles directly from these devices. For ease of illustration, various additional elements of network 102 are omitted from FIG. 1.

Figure 3:
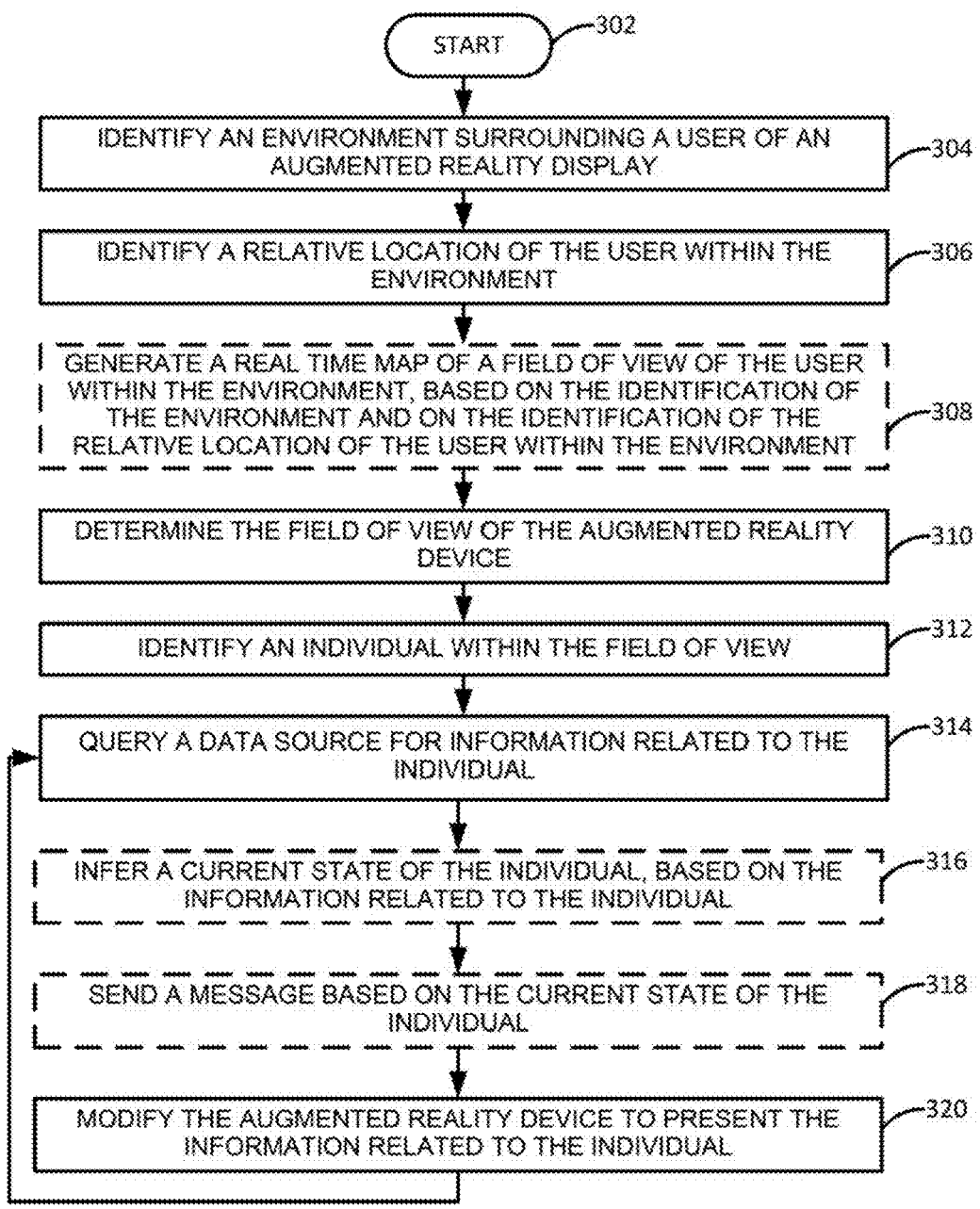
FIG. 3 illustrates a flowchart of an example method for providing an interactive augmented reality display which may be used to present information about members of a group in accordance with the present disclosure.

In one example, access network 122 may include an edge server 108, which may comprise a computing system or server, such as computing system 600 depicted in FIG. 6, and may be configured to provide one or more operations or functions for providing interactive augmented reality (AR) displays which may be used to present information about members of a group, as described herein. For instance, an example method 300 for providing an interactive augmented reality (AR) display which may be used to present information about members of a group is illustrated in FIG. 3 and described in greater detail below.

In one example, application server 104 may comprise a network function virtualization infrastructure (NFVI), e.g., one or more devices or servers that are available as host devices to host virtual machines (VMs), containers, or the like comprising virtual network functions (VNFs). In other words, at least a portion of the network 102 may incorporate software-defined network (SDN) components. Similarly, in one example, access networks 120 and 122 may comprise "edge clouds," which may include a plurality of nodes/host devices, e.g., computing resources comprising processors, e.g., central processing units (CPUs), graphics processing units (GPUs), programmable logic devices (PLDs), such as field programmable gate arrays (FPGAs), or the like, memory, storage, and so forth. In an example where the access network 122 comprises radio access networks, the nodes and other components of the access network 122 may be referred to as a mobile edge infrastructure. As just one example, edge server 108 may be instantiated on one or more servers hosting virtualization platforms for managing one or more virtual machines (VMs), containers, microservices, or the like. In other words, in one example, edge server 108 may comprise a VM, a container, or the like.

In one example, the access network 120 may be in communication with a server 110. Similarly, access network 122 may be in communication with one or more devices, including, e.g., an interactive augmented reality display 112 (hereinafter also referred to as a "display 112") and other devices such as a mobile device, a cellular smart phone, a wearable computing device (e.g., smart glasses, a virtual reality (VR) headset or other types of head mounted display, or the like), a laptop computer, a tablet computer, or the like. Access networks 120 and 122 may transmit and receive communications between server 110, display 112, other devices, application server (AS) 104, other components of network 102, devices reachable via the Internet in general, and so forth. In one example, display 112 may comprise a pair of glasses or eyewear (e.g., smart glasses, a gaming headset, a head mounted display, or the like) having built-in display elements that may present digitally created objects in a manner such that, when the digitally created objects are viewed simultaneously with the real world objects visible through the lenses of the glasses, an augmented reality display is created. In one example, display 112 may comprise a computing system or device, such as computing system 600 depicted in FIG. 6, and may be configured to provide one or more operations or functions in connection with examples of the present disclosure for providing interactive augmented reality (AR) displays which may be used to present information about members of a group.

Figure 2:
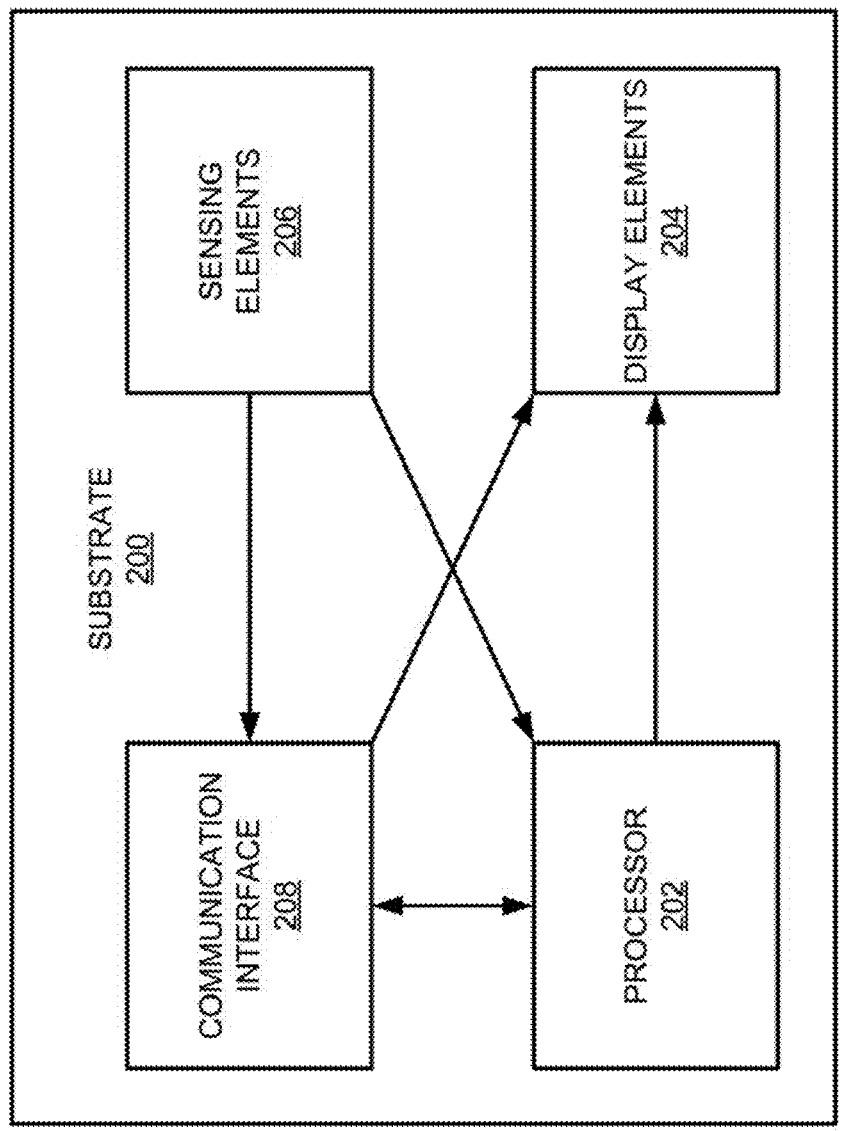
FIG. 2 illustrates one example configuration of the display of FIG. 1 which has been configured as a pair of glasses.

As discussed above, in one particular example, the display 112 comprises a pair of glasses, i.e., a transparent lens or set of lenses made to be wearable by the user (e.g., over the user's eyes). FIG. 2, for instance, illustrates one example configuration of the display 112 of FIG. 1 which has been configured as a pair of glasses. For instance, the display 112 may comprise a transparent substrate 200 (i.e., a lens or a set of lenses) in which a processor 202, a plurality of display elements 204, a plurality of sensing elements 206, and a communication interface 208 are embedded. The processor 202 may comprise, for example, a microprocessor, a central processing unit (CPU), or the like. The processor 202 may be in communication with, and may in some cases control operations of, the plurality of display elements 204, the plurality of sensing elements 206, and the communication interface 208.

The plurality of display elements 204 may comprise a plurality of pixels or similar display elements (e.g., display elements that are capable of emitting light and/or color). Each display element of the plurality of display elements 204 may be independently addressable by the processor 202. Thus, the processor 202 may send signals to specific display elements that may cause the specific display elements to change their appearances (e.g., change color, change the intensity of the light emitted, etc.). When all of the specific display elements addressed by the processor 202 change their appearances as instructed by the processor 202, the specific display elements may collectively form a desired image.

The plurality of sensing elements 206 may comprise a plurality of different types of sensors. For instance, the plurality of sensing elements 206 may include one or more of: image sensors (e.g., cameras), audio sensors (e.g., microphones), proximity sensors (e.g., infrared sensors, radio frequency ID sensors, and the like), and touch sensors (e.g., capacitive touch sensors, resistive touch sensors, and the like). In another example, the plurality of sensing elements 206 may also include short range wireless antennas (e.g., Bluetooth antennas, ZigBee antennas, Impulse Radio Ultra Wide Band (IR-UWB) antennas, and the like). The plurality of sensing elements 206 may provide streams of raw sensor data to the processor 202 for further analysis and processing. In one example, additional sensing elements 206 may be located externally to (e.g., not embedded in) the augmented reality display 112. For instance, additional sensing elements may be located throughout a room, a vehicle, or the like in which the augmented reality display 112 is deployed.

The communication interface 208 may comprise circuitry that allows the display 112 to communicative with one or more external devices (e.g., over short range or long range wireless protocols). For instance, the communication interface 208 may allow the processor 202 to send data to and receive data from a remote server (e.g., AS 104 and/or server 110), a mobile device that is in proximity to (e.g., within detection range of a short range wireless antenna of) the display 112 (e.g., a user's mobile phone, smart watch, augmented reality glasses, or the like). Thus, the communication interface 208 may comprise one or more transceivers, antennas, network access cards, and/or interfaces that facilitate communication with other devices.

In one example, server 110 may comprise a network-based server for providing an interactive augmented reality (AR) display which may be used to present information about members of a group. In this regard, server 110 may comprise the same or similar components as those of AS 104 and may provide the same or similar functions. Thus, any examples described herein with respect to AS 104 may similarly apply to server 110, and vice versa. In particular, server 110 may be a component of an AR system operated by an entity that is not a telecommunications network operator. For instance, a provider of an AR system may operate server 110 and may also operate edge server 108 in accordance with an arrangement with a telecommunication service provider offering edge computing resources to third-parties. However, in another example, a telecommunication network service provider may operate network 102 and access network 122, and may also provide an AR system via AS 104 and edge server 108. For instance, in such an example, the AR system may comprise an additional service that may be offered to subscribers, e.g., in addition to network access services, telephony services, traditional television services, and so forth.

In an illustrative example, an AR system may be provided via AS 104 and edge server 108. In one example, a user may engage an application on display 112 to establish one or more sessions with the AR system, e.g., a connection to edge server 108 (or a connection to edge server 108 and a connection to AS 104). In one example, the access network 122 may comprise a cellular network (e.g., a 4G network and/or an LTE network, or a portion thereof, such as an evolved Uniform Terrestrial Radio Access Network (eU-TRAN), an evolved packet core (EPC) network, etc., a 5G network, etc.). Thus, the communications between display 112 and edge server 108 may involve cellular communication via one or more base stations (e.g., eNodeBs, gNBs, or the like). However, in another example, the communications may alternatively or additional be via a non-cellular wireless communication modality, such as IEEE 802.11/Wi-Fi, or the like. For instance, access network 122 may comprise a wireless local area network (WLAN) containing at least one wireless access point (AP), e.g., a wireless router. Alternatively, or in addition, display 112 may communicate with access network 122, network 102, the Internet in general, etc., via a WLAN that interfaces with access network 122.

It should also be noted that the system 100 has been simplified. Thus, it should be noted that the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, the system 100 may include other network elements (not shown) such as border elements, routers, switches, policy servers, security devices, gateways, a content distribution network (CDN) and the like. For example, portions of network 102, access networks 120 and 122, and/or Internet may comprise a content distribution network (CDN) having ingest servers, edge servers, and the like for packet-based streaming of video, audio, or other content. Similarly, although only two access networks, 120 and 122 are shown, in other examples, access networks 120 and/or 122 may each comprise a plurality of different access networks that may interface with network 102 independently or in a chained manner. In addition, as described above, the functions of AS 104 may be similarly provided by server 110, or may be provided by AS 104 in conjunction with server 110. For instance, AS 104 and server 110 may be configured in a load balancing arrangement, or may be configured to provide for backups or redundancies with respect to each other, and so forth. Thus, these and other modifications are all contemplated within the scope of the present disclosure.

To further aid in understanding the present disclosure, FIG. 3 illustrates a flowchart of a method 300 for providing an interactive augmented reality (AR) display which may be used to present information about members of a group in accordance with the present disclosure. In one example, the method 300 may be performed by a server that is configured to generate digital overlays that may be superimposed over images of a "real world" environment viewed through the lens(es) of an AR device (e.g., a pair of AR glasses) to produce an augmented reality display, such as the AS 104 or server 110 or display 112 illustrated in FIG. 1. However, in other examples, the method 300 may be performed by another device, such as the AR device itself or the processor 602 of the system 600 illustrated in FIG. 6. For the sake of example, the method 300 is described as being performed by a processing system.

The method 300 beings in step 302. In step 304, the processing system may identify an environment surrounding a user of an augmented reality display. As discussed above, in one example, the augmented reality display may comprise a pair of AR glasses having display elements embedded in a transparent lens or set of lenses, such that augmented reality content may be presented to the user without obstructing the user's view of objects through the glasses. The user may be wearing the AR glasses, where the AR glasses are designed to assist the user with providing services to members of a group (i.e., passengers on an airplane, students in a class, visitors to a theme park or sports stadium, attendees of a conference, etc.). The identifying may be initiated in response to a signal from the user, such as the user pushing a button on the augmented reality display or another device that is communicatively coupled to the processing system, or the user powering on the augmented reality display.

In one example, identifying the environment may comprise detecting one or more AR markers that are positioned in fixed locations within the environment, where the markers may uniquely identify the environment (as well as, potentially, specific locations within the environment). For instance, FIG. 1 illustrates example AR markers $120_1$-$120_n$ (hereinafter individually referred to as an "AR marker 120" or collectively referred to as "AR markers 120") which are distributed throughout an environment 114 comprising the cabin of an airplane. In this case, the AR markers 120 may be located on some or all of the seats within the cabin, some or all of the overhead bins or walls, some or all of the emergency exits and restrooms, and/or on other surfaces within the cabin. By detecting one or more of the AR markers 120, the processing system may be able to identify the environment surrounding the user (e.g., by matching the markers to reference points in a stored map). In other examples, however, other techniques may be used to identify the environment, including marker-less and/or location-based AR techniques.

In one example, the augmented reality device may be pre-programmed to operate in (and to recognize) a plurality of different environments. For instance, where the augmented reality device comprises a pair of AR glasses for use by the cabin crew on an airplane, the AR glasses may be pre-programmed to operate on a plurality of different commercial airplane models having different seating configurations (e.g., single aisle with two seats on each side, double aisle with two seats on each side and three or five seats in the middle, etc.). Where the augmented reality device comprises a pair of AR glasses for use by personnel of a multi-purpose arena, the AR glasses may be pre-programmed to operate for a plurality of different events which may have different floor layouts and seating arrangements (e.g., basketball game, hockey game, concert, etc.).

In one example where the processing system is part of the augmented reality display, identifying the environment may be performed locally (e.g., by matchings AR markers or other features to features of a stored location that the augmented reality display is pre-programmed to operate in). In an example where the processing system is part of a remote server, the remote server may receive signals containing images or other data (e.g., AR markers) relating to the environment from the augmented reality display, and the remote server may identify the environment and provide the identification of the environment to the augmented reality display.

In step 306, the processing system may identify a relative location of the user (or, more specifically, of the AR device worn by the user) within the environment. In one example, the relative location of the user is determined based on knowledge of a map of the environment (e.g., as discussed above) and detection of the one or more AR markers 120, which may help the processing system to determine the user's location. In other words, knowing the layout of the environment, as well as the locations of specific AR markers 120 within the environment, may help the processing system to determine where the user is located, as well as a direction or an orientation in which the user is looking. For instance, if the position of the user relative to an AR marker can be determined, and a fixed location in the environment that is associated with the AR marker is known, then the relative location of the user within the environment can also be determined.

As with step 304, where the processing system is part of the augmented reality display, identifying the relative location may be performed locally by the augmented reality display based on the identification of the environment and the AR markers. Where the processing system is part of a remote server, the identifying may be performed by the server based on signals from the augmented reality display, where the signals may contain images of the user's field of view (e.g., including images of one or more AR markers or other features having known, fixed locations) that allow the remote server to orient the user within the environment. The remote server may then respond to the augmented reality display with the identification of the user's relative location.

In optional step 308 (illustrated in phantom), the processing system may generate a real time map of a field of view of the user within the environment, based on the identification of the environment and on the identification of the relative location of the user within the environment. In one example, the real time map may include location anchors to assist with orientation of the user within the environment.

Figures 4, 5:
FIG. 4 illustrates a portion of an example real time map of the cabin of the airplane illustrated in FIG. 1.
FIG. 5 illustrates example augmented reality content that is generated as an overlay for the field of view illustrated in FIG. 1.

FIG. 4, for instance, illustrates a portion of an example real time map 400 of the cabin of the airplane illustrated in FIG. 1. As illustrated, detection of the AR markers 120 allows the processing system to determine the locations of specific seats within the cabin which are within the user's field of view. These seats may be marked with location anchors $402_1$-$402_m$ (hereinafter individually referred to as a "location anchor 402" or collectively referred to as "location anchors 402") within the real time map 400, where the location anchors 402 indicate the seat numbers (e.g., 15C, 15D, 15E, etc.). The real time map 400 need not necessarily be displayed to the user, but may be stored and used by the processing system to determine where to position AR content within the user's field of view as discussed in greater detail below.

As with the previous steps, where the processing system is part of the augmented reality display, generating the real time map may be performed locally by the augmented reality display based on the identification of the environment and the relative location of the user. Where the processing system is part of a remote server, the generating may be performed by the server based on signals from the augmented reality display, where the signals may contain images of the user's field of view that allow the remote server to orient the user within the environment. The remote server may then respond to the augmented reality display with the real time map.

In step 310, the processing system may determine the field of view of the augmented reality display. In one example, the field of view may be determined using the real time map generated in step 308. Alternatively, the field of view may be determined based on knowledge of the relative location of the user within the environment plus knowledge of the orientation (e.g., x, y, z coordinates and/or yaw, pitch, and roll) of the augmented reality display, which may be determined using data collected by sensors (e.g., gyroscopes, accelerometers, image sensors, etc.) of the augmented reality display.

As with previous steps, where the processing system is part of the augmented reality display, determining the field of view may be performed locally by the augmented reality display based on the real time map or other information. Where the processing system is part of a remote server, the determining may be performed by the server based on signals from the augmented reality display, where the signals may contain images of the user's field of view or coordinates of the augmented reality display that allow the remote server to orient the user within the environment. The remote server may then respond to the augmented reality display with the field of view.

In step 312, the processing system may identify an individual within the field of view, e.g., via a plurality of databases with stored information such as images audios, and device identifiers. In one example, the processing system may analyze data from one or more sensors in order to identify the individual. For instance, images from an imaging sensor may be analyzed using facial recognition techniques in order to determine the identity of an individual. Audio recordings from an audio sensor may be analyzed using voice recognition techniques in order to determine the identity of an individual. A signal detected by a short range wireless transceiver may be analyzed to extract an identifier of a device that is known to belong to a specific individual.

In another example, data from an external data source may be consulted in order to identify the individual. For instance, if the field of view comprises part of the cabin of an airplane as shown in FIG. 4, the processing system may retrieve a passenger manifest from a database of the airline in order to identify the individuals who are assigned to the seats within the field of view (e.g., James Franklin is assigned to Seat 15D). Similarly, if the field of view comprises a portion of the seating in a baseball stadium, the processing system may retrieve ticket information, e.g., season ticket information from a database of the baseball team in order to identify the individuals to whom a particular seat belongs.

Where the processing system is part of the augmented reality display, identifying the individual may comprise sending identifying data (e.g., images, audio data, mobile subscriber numbers or other identifying device data, seat numbers, etc.) to a remote server for further analysis or database query. Where the processing system is part of a remote server, the identifying may be performed by the server based on signals from the augmented reality display, where the signals may contain identifying data of the individual. The remote server may then respond to the augmented reality display with the identification of the individual.

In step 314, the processing system may query a data source for information related to the individual. In one example, the data source may comprise a remote database. The remote database may maintain profiles for individuals who are customers of a specific enterprise (e.g., frequent fliers on a specific airline, students at a specific school, season ticket holders of a specific sports team, attendees of a specific concert, etc.). In another example, the data source may comprise a device belonging to the individual (e.g., the individual's mobile phone, smart watch, or the like).

As discussed above, the profile for an individual may include one or more of the following items of information: the individual's name, an identification number (e.g., frequent flier number, season pass account number, student identifier, or the like) associated with the individual, a seat number assigned to the individual (e.g., on an airplane or train, in a stadium or theater, etc.), contact information (e.g., email address, mobile phone number, etc.) for the individual, an identifier for the individual's belongings (e.g., checked luggage or other items), a priority status assigned to the individual (e.g., VIP, elite status, etc.), health data associated with the individual (e.g., existing allergies, medical conditions, special needs, etc., as well as real-time health data which may be provided via sensors in and/or around the individual's seat), a privacy status associated with the individual (e.g., what types of information the individual is willing or not willing to share with the AR system), a rating associated with the individual (e.g., ease of historical interactions with the individual), the individual's preferences (e.g., aisle seating, vegetarian meals, quiet car, lighting and temperature preferences, etc.), identifiers (e.g., names, identification numbers, or the like) of the individual's frequent companions or contacts (e.g., family members, potentially including seat numbers and other information for these companions), and/or the individual's status on the present day (e.g., flight numbers, flight times, gate changes, delays, rental car or shuttle reservations, hotel reservations, etc.).

As in previous steps, where the processing system is part of the augmented reality display, querying the data source may be performed locally by the augmented reality display communicating directly with the data source. Where the processing system is part of a remote server, the querying may be performed by the server based on signals from the augmented reality display, where the signals may contain an identification of the individual. The remote server may then respond to the augmented reality display with any data matching the query or with augmented reality content created from the matching data, as described in further detail below.

In one example, the information related to the individual may include real time information about the individual which may not be stored in the profile. The real time information may include information which is collected from sensors that are currently in proximity to the individual. For instance, sensors integrated into the individual's devices (e.g., mobile phone, smart watch, or the like) or sensors positioned in or near the individual's seat (e.g., biometric sensors, cameras, microphones, etc.) may collect data from which the individual's real time or present state can be inferred. In another example, this real time information could be sent from the sensors to the data source and stored temporarily in the profile for the individual (e.g., the real time information could be tagged with metadata to indicate that the real time information should be deleted from the profile in ten minutes, one hour, twenty four hours, or the like).

As in the previous steps, where the processing system is part of the augmented reality display, collecting the real time information may be performed locally by the augmented reality display communicating directly with the sensors. Where the processing system is part of a remote server, the collecting may be performed by the server communicating directly with the sensors, or communicating with the augmented reality display which operates as a relay for communicating sensor data to the remote server.

In optional step 316 (illustrated in phantom), the processing system may infer a current state of the individual, based on the information related to the individual (e.g., real time information) that is retrieved in step 314. As discussed above, sensors integrated into the individual's devices or positioned in or near the individual's seat may collect information from which the individual's current state can be inferred. For instance, biometric sensors embedded in the individual's seat may monitor the individual's heart rate and breathing; based on readings from these biometric sensors, the processing system may infer that the individual is asleep. Similarly, a breathalyzer or other sensors configured to detect ingestion of a specific substance may monitor the individual's blood alcohol content (or other measures of a substance in the individual's system); based on readings from the breathalyzer (or other sensors), the processing system may infer that the individual is impaired (e.g., blood alcohol content is above the legal limit to drive). In this case, ingestion may mean absorbing any sort of substance through the mouth, nose, or skin (e.g., eating, drinking, smoking, snorting, injecting, etc.). Alternatively, blood alcohol content could be estimated based on data collected by a weight sensor in the individual's seat and tracking a number and alcohol content of alcoholic beverages served (e.g., purchased by the individual) to the individual in-flight. A camera or similar sensor may provide images from which the processing system may determine that the individual is working on a laptop computer, reading a book, watching a movie, or the like.

As an extension of the above, the current state may also include the presence of a specific prohibited substance on the individual's person. For instance, sensors configured to detect a specific substance, or image sensors, could detect when the individual is in possession of cigarettes, narcotics, alcohol or other outside food or beverages, or potential allergens that could pose threats to others in the environment (e.g., a peanut butter sandwich on an airplane). In further examples, the sensors may be configured to detect odors that may create an uncomfortable environment for others, such as excessive perfume or body odors.

The current state may also include a history of service provided to the individual during the individual's current visit. For instance, if the individual is an airline passenger, then the processing system may be able to determine, based on information collected by the sensors, what types of food and beverage items were provided to the individual and when, whether the individual requested items such as blankets, listening devices, and the like, whether the individual requested a seat change or upgrade, and other service-based actions.

As in the previous steps, where the processing system is part of the augmented reality display, inferring the current state of the individual may be performed locally by the augmented reality display based on the real time information. Where the processing system is part of a remote server, the inferring may be performed by the server using the real time information provided by the sensors and/or the augmented reality display. The remote server may then communicate any inferred state of the individual to the augmented reality display.

In optional step 318 (illustrated in phantom), the processing system may send a message based on the current state of the individual. The message may not necessarily comprise AR content, but may instead comprise a text message, an email message, a synthesized voice message, or the like delivered to an AR or a non-AR device. The message may be sent to the individual, to another service provider (other than the user of the augmented reality display) who is providing or is expected to provide service to the individual, or to someone else.

For instance, if the individual is a passenger on an airplane, and the current state of the individual includes a blood alcohol content that is above the legal limit for driving, then the message may comprise an email or other alerts to a rental car company with whom the individual has arranged to rent a car on landing. The car rental information in this case may have been obtained from the data source that was queried in step 314.

Similarly, if the individual is a passenger on an airline, and the individual has requested an item or assistance from the cabin crew, the message may comprise a text message sent to the individual's device (e.g., mobile phone or smart watch) or to a display device that is integrated in the individual's seat (e.g., a television screen mounted to the back of the seat directly in front of the individual) that acknowledges the individual's request and/or provides an estimated time of response (e.g., "A crew member will be with you shortly.").

As in the previous steps, where the processing system is part of the augmented reality display, the message may be sent by the augmented reality display. Where the processing system is part of a remote server, the message may be sent by the server, but a copy of the message may be sent to the augmented reality display or may be made otherwise accessible to the augmented reality display (e.g., in a message history or individual profile).

In step 320, the processing system may modify the augmented reality display to present the information related to the individual. For instance, the processing system may generate a digital overlay that may be presented by altering the appearance of the display elements that are embedded in the augmented reality display and may send this digital overlay to the augmented reality display. As an example, the processing system may generate a digital overlay that includes text and/or images about the individual that may help the user to provide better service to the individual. As an example, if the individual is an airline passenger, the digital overlay may include text indicating that the individual is to receive a vegetarian meal. If the individual is an attendee at a theater event, the digital overlay may include an icon indicating that the individual has a mobility impairment and may need assistance getting to their seat. If the individual is a student in a classroom, the digital overlay may include text indicating that the individual has an injury or illness that excuses him or her from part of a lesson. If the individual has set their privacy status so that some or all of their information is blocked from access or display, then the digital overlay may simply indicate that the individual's status is set to "private."

FIG. 5, for instance, illustrates example augmented reality content that is generated as an overlay 500 for the field of view illustrated in FIG. 1. In one example, the overlay may comprise a text box (which may also contain images, icons, and/or other content in some examples). In the example illustrated in FIG. 5, the information presented in the overlay includes the name of the passenger (James Franklin) in the indicated seat (15D), the individual's frequent flier status (Medallion Club), food and beverage preferences (gluten free, black coffee), and travel status (second leg of a twelve-hour flight). The processing system may send signals to the display elements of the AR device that cause the display elements to alter their appearances to present the desired information in desired locations on the display (e.g., to present the overlay 500).

In one example, the information presented in step 320 may include options to perform actions. Some of these actions may comprise further modifications to the display of the augmented reality display, while some of these actions may involve interaction with other computing systems not including the augmented reality display. For instance, an action that modifies the display may include an option to expand the information provided about a specific individual, to condense the information provided about a specific individual, or to present information about a different individual. An action that involves interaction with other computing systems may include an option to send a message to the individual, to anther service provider who is or will be providing service to the individual, or to someone else.

As the previous steps, where the processing system is part of the augmented reality display, generating the digital overlay may be performed locally by the augmented reality display based on the information about the individual (which may be obtained by the augmented reality display directly from the data source or indirectly via the remote server). Where the processing system is part of a remote server, the digital overlay may be generated by the server and forwarded to the augmented reality display for use.

The method 300 may return to step 314 and continue to monitor and present information about the individual until such time as the user requests that monitoring be stopped or powers off or removes the augmented reality display. Moreover, the method 300 may be repeated for any number of individuals in proximity to the user. For instance, although FIG. 5 shows information for a single passenger of an airplane, an overlay could be created to provide information about a plurality of the passengers of the airplane simultaneously. This information could be provided in text boxes similar to the overlay 500, which can be expanded or condensed on demand to show more or less information for a particular passenger.

In further examples, the augmented reality display could be used to present a filtered view of the individuals who are present within an environment. For instance, a member of the cabin crew on an airplane may ask to see all of the passengers who are coffee drinkers, and the augmented reality display may be modified to display responsive AR content, such as a coffee cup icon positioned above the seat of each passenger within the crew member's field of view whose preferred in-flight drink is coffee. Similarly, the crew member may ask which passengers have been served their drink/snack/meal, and the augmented reality display may be modified to display responsive AR content, such as an icon or text box above each passenger in the crew member's field of view, where the icon or text box indicates whether the passenger has been served or not (and optionally, if served, how long ago). In another example, the crew member may ask to see passengers who are traveling companions, but who are not seated together (e.g., in adjacent or contiguously-numbered seats). In this case, the augmented reality display may be modified to display responsive AR content, such as an icon or text box above each passenger who belongs to the same itinerary or traveling party.

In further examples, the augmented reality display may be used to display messages from individuals to the user. For instance, where the user is a member of the cabin crew on an airplane, passengers on the airplane may be able to push a button on their armrests, in-flight entertainment system, or the like to request items like food, beverages, blankets, and the like. In this case, the device at which the message or request is input may communicate with a database or directly with the augmented reality display to store and forward the message or request. The message or request may then be displayed on the user's augmented reality display. For instance, a text box may appear above the passenger's seat with the passenger's name; seat number, and message or request (e.g., Seat 15D, James Franklin, REQUEST: cup of water). In one example, the user may request that the augmented reality display show all pending messages or requests from members of a group being served by the user. In another example, the messages or requests may be automatically displayed as they are received, or display may be temporarily delayed if the user is currently using the augmented reality display to display other information.

In all of these examples, the augmented reality display may include a microphone to capture spoken commands or requests from the user. In other examples, however, the augmented reality display may include a dedicated button or another input device that is capable of receiving commands or requests in different modalities.

As discussed above, in some cases, individuals may wish to limit what information about them is accessible or viewable to the user of the augmented reality display. In one example, an individual may ask (e.g., via their own endpoint device, which may communicate with a data source that stores the individual's profile) to see his or her profile, and is permitted to make changes to the profile consistent with the individual's desired privacy settings (e.g., to make certain types of information visible or not visible).

Moreover, although the method 300 is described above as being performed by the augmented reality display or by the remote server, it will be appreciated that some steps of the method 300 could be performed by the augmented reality display, while other steps could be performed by the remote server. For instance, the augmented reality display may collect data about an individual in the field of view, and send the data to the remote server for identification and query of the data source. The remote server may then send information about the individual to the augmented reality display, and the augmented reality display may format the information into AR content for display to the user. Other examples in which the steps of the method 300 are distributed between the augmented reality display and the remote server are also contemplated within the scope pf the present disclosure.

Although not expressly specified above, one or more steps of the method 300 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 3 that recite a determining operation or involve a decision do not necessarily require that both branches of the determining operation be practiced. In other words, one of the branches of the determining operation can be deemed as an optional step. However, the use of the term "optional step" is intended to only reflect different variations of a particular illustrative embodiment and is not intended to indicate that steps not labelled as optional steps to be deemed to be essential steps. Furthermore, operations, steps or blocks of the above described method(s) can be combined, separated, and/or performed in a different order from that described above, without departing from the examples of the present disclosure.

FIG. 6 depicts a high-level block diagram of a computing device specifically programmed to perform the functions described herein. For example, any one or more components or devices illustrated in FIG. 1 or described in connection with the method 300 may be implemented as the system 600. For instance, a server or an augmented reality display could be implemented as illustrated in FIG. 6.

As depicted in FIG. 6, the system 600 comprises a hardware processor element 602, a memory 604, a module 605 for providing an interactive augmented reality display, and various input/output (I/O) devices 606.

The hardware processor 602 may comprise, for example, a microprocessor, a central processing unit (CPU), or the like. The memory 604 may comprise, for example, random access memory (RAM), read only memory (ROM), a disk drive, an optical drive, a magnetic drive, and/or a Universal Serial Bus (USB) drive. The module 605 for providing an interactive augmented reality display may include circuitry and/or logic for performing special purpose functions relating to the operation of a home gateway or XR server. The input/output devices 606 may include, for example, a camera, a video camera, storage devices (including but not limited to, a tape drive, a floppy drive, a hard disk drive or a compact disk drive), a receiver, a transmitter, a speaker, a display, a speech synthesizer, an output port, and a user input device (such as a keyboard, a keypad, a mouse, and the like), or a sensor.

Although only one processor element is shown, it should be noted that the computer may employ a plurality of processor elements. Furthermore, although only one computer is shown in the Figure, if the method(s) as discussed above is implemented in a distributed or parallel manner for a particular illustrative example, i.e., the steps of the above method(s) or the entire method(s) are implemented across multiple or parallel computers, then the computer of this Figure is intended to represent each of those multiple computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed method(s). In one example, instructions and data for the present module or process 605 for providing an interactive augmented reality display (e.g., a software program comprising computer-executable instructions) can be loaded into memory 604 and executed by hardware processor element 602 to implement the steps, functions or operations as discussed above in connection with the example method 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 605 for providing an interactive augmented reality display (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of example only, and not limitation. Thus, the breadth and scope of a preferred example should not be limited by any of the above-described example examples, but should be defined only in accordance with the following claims and their equivalents.

What is claimed is:

1. A method comprising:
   determining, by a processing system including at least one processor, an identity of an environment surrounding a user of an augmented reality display by matching a feature of the environment that is visible through the augmented reality display to a feature of a known location;
   identifying, by the processing system, a relative location of the user within the environment;
   determining, by the processing system, a field of view of the augmented reality display;
   identifying, by the processing system, a person within the field of view who is also physically present in the environment, wherein the person is a member of a group of people being assisted by the user;
   querying, by the processing system, a data source for information related to the person, wherein the information related to the person comprises real time information about the person which is collected from a sensor located in the environment;
   inferring, by the processing system, a current state of the person, based on the real time information, wherein the current state comprises at least one of:
   whether the person is awake or asleep, whether the person has ingested a substance that may impair the person, whether the person is engaged in an activity, or whether the person is in possession of a prohibited item;
   modifying, by the processing system, the augmented reality display to present the current state of the person to the user; and
   sending, by the processing system, an automatically generated message describing the current state of the person to a device outside of the environment, wherein a copy of the automatically generated message is also made available to the augmented reality display.

2. The method of claim 1, wherein the feature comprises an augmented reality marker located in the environment, wherein the augmented reality marker uniquely indicates the identity of the environment, and wherein the processing system detects the augmented reality marker through the augmented reality display.

3. The method of claim 2, wherein the identifying the relative location comprises:
   identifying a fixed location in the environment relative to the user, wherein the fixed location is associated with the augmented reality marker.

4. The method of claim 2, wherein the field of view is determined based on an image of the augmented reality marker that is captured by the augmented reality display.

5. The method of claim 4, wherein the field of view is further determined based on coordinates of the augmented reality display.

6. The method of claim 1, wherein the data source maintains a plurality of profiles for a plurality of members of the group.

7. The method of claim 6, wherein a profile of the plurality of profiles that is associated with the person includes at least one of: a name of the person, an identification number associated with the person, a seat number assigned to the person, contact information for the person, an identifier for belongings of the person, a priority status assigned to the person, health data associated with the person, a privacy status associated with the person, a rating associated with the person, a preference of the person, an identifier of a companion of the person, or a status of the person on a present day.

8. The method of claim 1, wherein the modifying comprises generating a digital overlay for presentation on the augmented reality display.

9. The method of claim 1, wherein the sensor is integrated in a device of the person.

10. The method of claim 1, wherein the information related to the person includes information about a service that is expected to be provided to the person at a future time by a service provider, and wherein the device outside of the environment is a device of the service provider.

11. The method of claim 10, wherein the service provider is a party who is separate from the user and from the group of people being assisted by the user.

12. The method of claim 11, wherein an association of the service provider with the person is detected in the data source.

13. The method of claim 1, wherein the modifying is performed in response to a request from the user.

14. The method of claim 1, wherein the augmented reality display is further modified to present a message from the person.

15. The method of claim 1, wherein the augmented reality display comprises a pair of augmented reality glasses.

16. The method of claim 1, wherein the person is one of a plurality of people present in the environment who matches a filtering criterion specified by the user, wherein the modifying comprises presenting additional information to assist the user in differentiating between the plurality of people and other people present in the environment who do not match the filtering criterion.

17. A non-transitory computer-readable medium storing instructions which, when executed by a processing system including at least one processor, cause the processing system to perform operations, the operations comprising:
    determining an identity of an environment surrounding a user of an augmented reality display by matching a feature of the environment that is visible through the augmented reality display to a feature of a known location;
    identifying a relative location of the user within the environment;
    determining a field of view of the augmented reality display;
    identifying a person within the field of view who is also physically present in the environment, wherein the person is a member of a group of people being assisted by the user;
    querying a data source for information related to the person, wherein the information related to the person comprises real time information about the person which is collected from a sensor located in the environment;
    inferring a current state of the person, based on the real time information, wherein the current state comprises at least one of: whether the person is awake or asleep, whether the person has ingested a substance that may impair the person, whether the person is engaged in an activity, or whether the person is in possession of a prohibited item; and
    modifying the augmented reality display to present the current state of the person to the user; and
    sending an automatically generated message describing the current state of the person to a device outside of the environment, wherein a copy of the automatically generated message is also made available to the augmented reality display.

18. A device comprising:
    a processing system including at least one processor; and
    a computer-readable medium storing instructions which, when executed by the processing system, cause the processing system to perform operations, the operations comprising:
    determining an identity of an environment surrounding a user of an augmented reality display by matching a feature of the environment that is visible through the augmented reality display to a feature of a known location;
    identifying a relative location of the user within the environment;
    determining a field of view of the augmented reality display;
    identifying a person within the field of view who is also physically present in the environment, wherein the person is a member of a group of people being assisted by the user;
    querying a data source for information related to the person, wherein the information related to the person comprises real time information about the person which is collected from a sensor located in the environment;
    inferring a current state of the person, based on the real time information, wherein the current state comprises at least one of: whether the person is awake or asleep, whether the person has ingested a substance that may impair the person, whether the person is engaged in an activity, or whether the person is in possession of a prohibited item; and
    modifying the augmented reality display to present the current state of the person to the user; and
    sending an automatically generated message describing the current state of the person to a device outside of the environment, wherein a copy of the automatically generated message is also made available to the augmented reality display.

* * * * *